(12) United States Patent
Schroeder

(10) Patent No.: US 10,176,662 B2
(45) Date of Patent: Jan. 8, 2019

(54) EMPTIES SORTING DEVICE AND EMPTIES RETURN SYSTEM

(71) Applicant: Wincor Nixdorf International GmbH, Paderborn (DE)

(72) Inventor: Berthold Schroeder, Ilmenau (DE)

(73) Assignee: Wincor Nixdorf International, GmbH, Paderborn (DE)

( * ) Notice: Subject to any disclaimer, the term of this patent is extended or adjusted under 35 U.S.C. 154(b) by 0 days.

(21) Appl. No.: 15/431,812

(22) Filed: Feb. 14, 2017

(65) Prior Publication Data
US 2017/0243429 A1  Aug. 24, 2017

(30) Foreign Application Priority Data
Feb. 19, 2016 (DE) .................. 10 2016 102 944

(51) Int. Cl.
*B07C 5/00* (2006.01)
*G07F 7/06* (2006.01)
(Continued)

(52) U.S. Cl.
CPC ............ *G07F 7/0609* (2013.01); *B07C 1/10* (2013.01); *B07C 5/122* (2013.01); *B07C 5/126* (2013.01);
(Continued)

(58) Field of Classification Search
CPC .... B07C 1/10; B07C 5/12; B07C 5/34; B07C 5/122; B07C 5/3408
(Continued)

(56) References Cited

U.S. PATENT DOCUMENTS 2,821,302 A    1/1958  Fowler et al.
3,106,293 A *  10/1963 Albertson, Jr. ......... B07C 5/065
                                                   209/539
(Continued)

FOREIGN PATENT DOCUMENTS

DE    2020748 A    11/1971
DE    1456863 B    12/1971
(Continued)

OTHER PUBLICATIONS

German Search Report based on application No. 10 2016 102 944.0 (7 pages) dated Sep. 21, 2016 (for reference purpose only).
(Continued)

*Primary Examiner* — Terrell H Matthews
(74) *Attorney, Agent, or Firm* — Black, McCuskey, Souers & Arbaugh, LPA

(57) ABSTRACT

An empties sorting device includes a sorting table with a table surface, a feed section, and a discharge section. The discharge section has a dividing device with at least one section partition wall. The device further includes a conveying device, which is designed in such a way that the empties can be transferred from the feed section to the discharge section, and a guiding device with a guiding element, designed to be movable at least into a first guiding position associated with a first collecting channel, and a second guiding position associated with a second collecting channel, and a controller designed to control the movement of the guiding element into the first and second guiding positions in accordance with the type of empties. A discharge section partition wall between the collecting channels can be moved parallel to the table surface, thus allowing an associated collecting channel size to be varied.

15 Claims, 3 Drawing Sheets

(51) Int. Cl.
  *B07C 5/12* (2006.01)
  *B07C 1/10* (2006.01)
  *B07C 5/34* (2006.01)
  *B65G 47/14* (2006.01)
  *B65G 47/71* (2006.01)
  *B65G 47/76* (2006.01)

(52) U.S. Cl.
  CPC ........ *B07C 5/3408* (2013.01); *B65G 47/1471* (2013.01); *B07C 5/12* (2013.01); *B07C 5/34* (2013.01); *B65G 47/14* (2013.01); *B65G 47/71* (2013.01); *B65G 47/766* (2013.01); *B65G 2201/0244* (2013.01); *G07F 7/06* (2013.01)

(58) Field of Classification Search
  USPC .................................................. 209/522, 552
  See application file for complete search history.

(56) References Cited

U.S. PATENT DOCUMENTS

| | | | | |
|---|---|---|---|---|
| 3,352,404 A | | 11/1967 | Settembrini | |
| 4,142,636 A | * | 3/1979 | Planke | B07C 5/126 198/367 |
| 4,479,582 A | * | 10/1984 | Ducloux | B07C 5/122 198/367 |
| 4,760,908 A | * | 8/1988 | Houghton | B65G 47/844 198/370.02 |
| 5,462,153 A | * | 10/1995 | Friis | B65D 88/62 198/347.2 |
| 5,931,281 A | * | 8/1999 | Zeis | B65G 47/846 198/598 |
| 2005/0263374 A1 | * | 12/2005 | Beesley | B65G 47/5131 198/594 |
| 2010/0294619 A1 | * | 11/2010 | Hahn | B65G 47/5109 198/368 |
| 2011/0108388 A1 | * | 5/2011 | Van Den Goor | B65G 17/066 198/370.02 |
| 2013/0062263 A1 | * | 3/2013 | Nakano | B65G 47/647 209/552 |
| 2018/0016100 A1 | * | 1/2018 | Axmann | B65G 47/844 |

FOREIGN PATENT DOCUMENTS

| | | | |
|---|---|---|---|
| DE | 2211124 A | 9/1973 | |
| DE | 2402145 A1 | 7/1975 | |
| DE | 3444462 A1 | 6/1986 | |
| DE | 19535614 A1 | 3/1996 | |
| DE | 29700779 U1 | 4/1997 | |
| DE | 19719769 A1 | 11/1998 | |
| DE | 102008038003 A1 | 2/2010 | |
| EP | 0191584 A2 | 8/1986 | |
| EP | 2163315 B1 | 3/2012 | |
| EP | 3009200 A1 | 4/2016 | |
| EP | 3208783 A1 * | 8/2017 | ............ B07C 5/122 |
| WO | 2005069233 A1 | 7/2005 | |

OTHER PUBLICATIONS

European Search Report based on application No. 17150259.4-1871 (10 pages) dated Jun. 29, 2017 (Reference Purpose Only).

* cited by examiner

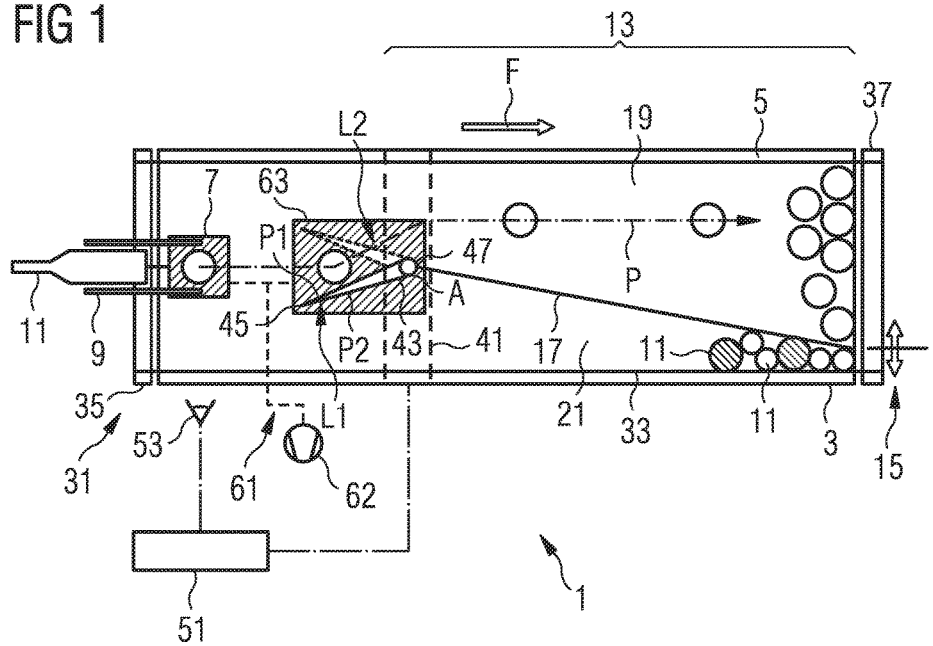
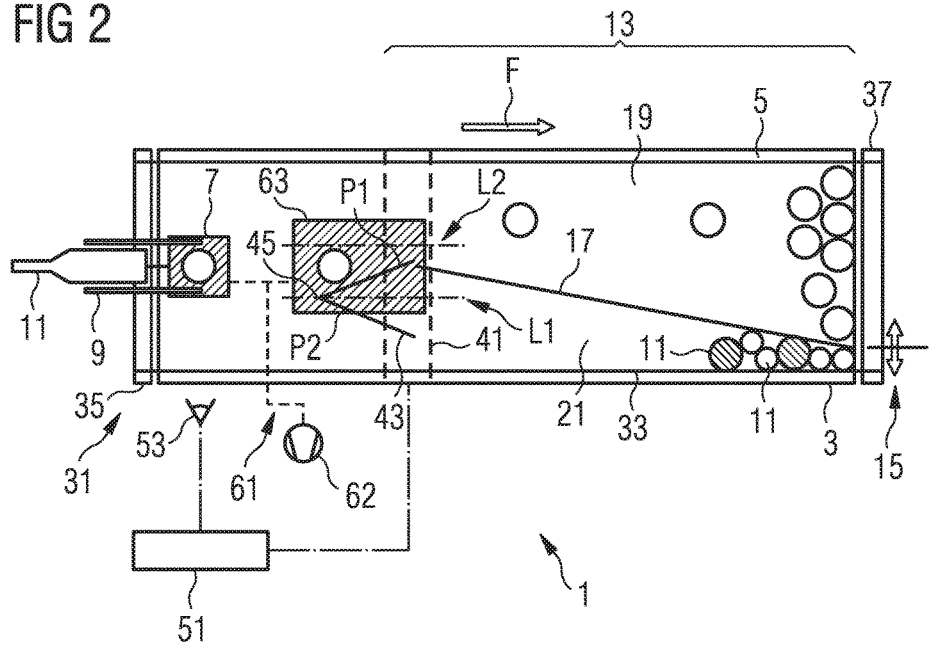

EMPTIES SORTING DEVICE AND EMPTIES RETURN SYSTEM

CROSS-REFERENCE TO RELATED APPLICATION

This application claims priority to German Patent Application Serial No. 10 2016 102 944.0, which was filed Feb. 19, 2016, and is incorporated herein by reference in its entirety.

TECHNICAL FIELD

Various embodiments relate generally to an empties sorting device and an empties return system for automatically sorting empties.

BACKGROUND

Empties, which are in the form of packages, for example, such as returnable bottles, e.g. plastic and glass bottles, are generally returned individually by consumers by means of automatic empties return appliances, which are set up in supermarkets, for example. The conventional practice is that the returned empties in the form of different and intermingled bottles are discharged onto an empties sorting table by the automatic empties return appliance and are then sorted manually into empties crates by workers at the empties return point, allowing correctly sorted empties crates to be transported to an empties recycling point. However, manual sorting of empties starting from a collection of different and intermingled bottles is time-consuming and, at the same time, manual sorting of the empties into the empties crates to obtain correctly sorted empties crates is subject to a high potential for error (incorrectly sorted empties crates represent a loss of value for the empties return point).

SUMMARY

An empties sorting device includes a sorting table with a table surface, a feed section, and a discharge section. The discharge section has a dividing device with at least one section partition wall. The device further includes a conveying device, which is designed in such a way that the empties can be transferred from the feed section to the discharge section, and a guiding device with a guiding element, designed to be movable at least into a first guiding position associated with a first collecting channel, and a second guiding position associated with a second collecting channel, and a controller designed to control the movement of the guiding element into the first and second guiding positions in accordance with the type of empties. A discharge section partition wall between the collecting channels can be moved parallel to the table surface, thus allowing an associated collecting channel size to be varied.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a schematic plan view of an empties sorting device according to an illustrative embodiment having a pivotable empties guiding element;

FIG. 2 shows a schematic plan view of another empties sorting device according to an illustrative embodiment having a movable empties guiding element;

DESCRIPTION

Figure 3:
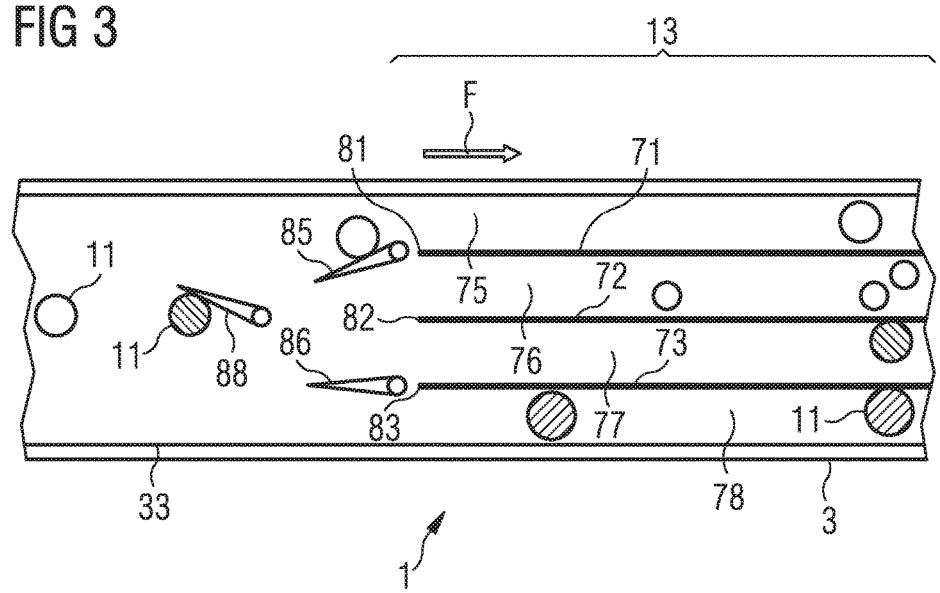
FIG. 3 shows a schematic plan view of another empties sorting device according to an illustrative embodiment having a plurality of empties guiding elements.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the following detailed description, reference is made to the attached drawings, which form part thereof and in which, for the sake of illustration, specific embodiments are shown in which the invention can be carried out. In this respect, directional terminology, such as "top", "bottom", "at the front", "at the rear", "front", "rear" etc. are used in respect of the orientation of the figure(s) described. Since components of embodiments can be positioned in a number of different orientations, the directional terminology serves for illustration and is in no way restrictive. It goes without saying that other embodiments can be used and structural or logical changes can be made without departing from the scope of protection of the present invention. It goes without saying that the features of the various illustrative embodiments described herein can be combined with one another, unless specifically stated otherwise. The following detailed description is therefore not to be interpreted in a restrictive sense, and the scope of protection of the present invention is defined by the attached claims.

In the context of this description, the terms "connected", "linked" and "coupled" are used to describe both direct and indirect connection, direct or indirect linking and direct or indirect coupling.

An empties sorting device and an empties return system which allow automatic sorting of mixed, differing empties, e.g. in the form described above, into different (e.g. correctly sorted) empties fractions are provided.

An empties sorting device according to one illustrative embodiment for the automatic sorting of empties can have an empties sorting table, an empties conveying device, an empties guiding device and a control unit. The empties include an individual (at least substantially) empty beverage container, such as a reusable bottle, e.g. a plastic or glass bottle, or a collection of beverage containers. By the empties sorting device, the empties can be pre-sorted into different empties fractions, e.g. for manual sorting by workers at an empties collection point (e.g. a supermarket or cash-and-carry outlet for drinks), thus allowing the workers, working at the empties sorting table for example, to sort the empties into empties crates, and/or the empties can be sorted correctly in advance for subsequent handling, e.g. automatic handling.

The empties sorting table of the empties sorting device can have a table surface, an empties feed section and an empties discharge section. The table surface is rectangular or round, for example, and is elongate, for example. The empties feed section, which is arranged in an edge region (e.g. on a narrow side) of the table surface, for example, and extends over the entire width of the table surface, for example, or is limited to only a limited area, for example, being arranged in a central region at the edge of the table surface for example, can be supplied with empties of different types, e.g. automatically, (i.e. empties can be fed onto the empties sorting table over the entire/along the entire width of said table, or just in a limited region). The empties discharge section has a discharge-section dividing device with at least one discharge section partition wall, for example (which partition wall can be designed as a panel, as a strip or as a band, for example), by which the empties discharge section is divided into at least one first and one second empties collecting channel, which are separated from one another by the at least one discharge section partition wall (e.g. the empties collecting channels, if not delimited by a discharge section partition wall/discharge section partition walls, are delimited by the external geometry of the empties sorting table).

The empties conveying device of the empties sorting device (e.g. a conveyor belt in the case of an empties sorting table which is, for example, rectangular, or a rotating disc/turntable in the case of a round empties sorting table, for example) can be installed on the empties sorting table (e.g. on the table surface of the empties sorting table) and can extend between the empties feed section and the empties discharge section and can be designed in such a way that the empties fed to the empties feed section by the empties conveying device can be transferred from the empties feed section to the empties discharge section in a transfer conveying direction. Transfer of the empties takes place, for example, at a speed, (e.g. a conveyor belt speed or a speed of rotation of the turntable corresponding thereto) of, for example, about 100 mm/s to about 450 mm/s, e.g. optionally about 150 mm/s to about 225 mm/s.

The empties guiding device of the empties sorting device can have a movable empties guiding element, which is arranged on the empties sorting table upstream of the empties collecting channels in respect of the transfer conveying direction (e.g. above the empties conveying device, perpendicularly to the table surface) and which is designed to be movable at least into a first guiding position, which is associated with the first empties collecting channel, and a second guiding position, which is associated with the second empties collecting channel, in order to guide the empties conveyed in the transfer conveying direction on the empties sorting table by means of the empties conveying device selectively to the first and the second empties collecting channel.

The control unit of the empties sorting device can have a sensor, for example (e.g. a camera and/or a barcode scanner), by means of which the respective type of empties among the empties fed to the empties feed section can be automatically detected, and can be connected to the empties guiding device and designed to control the movement of the empties guiding element into the first and second guiding positions thereof in accordance with the type of empties detected in order thereby to guide the empties selectively to the first empties collecting channel and the second empties collecting channel according to the type of empties.

The empties guiding element can be designed as a panel, for example (e.g. as a plate or as a plate-shaped grid element), e.g. with (outer) mutually opposite panel surfaces (e.g. panel surfaces which converge in a wedge shape counter to the transfer conveying direction) and which extend at least substantially perpendicularly to the table surface and serve as empties guiding surfaces for contacting and guiding the empties, wherein the panel can be moved with its panel surfaces at least substantially transversely to the transfer conveying direction. For example, one or the other panel surface is oriented (upstream) at an angle to the transfer conveying direction in the two guiding positions. The angle is predetermined, e.g. can be adjusted by the control unit approximately in a range of 5° to 40°, e.g. optionally approximately in a range of 10° to 25°, or, for example, in accordance with a conveying speed of the empties conveying device (wherein the conveying speed of the empties conveying device can be detected by a sensor connected to the control unit, for example). Moreover, the movement of the empties guiding element can also be performed if it is contacted at this moment by empties conveyed past it by the empties conveying device, in order to move the empties actively on the empties conveying device. The empties guiding element can also be implemented as a baffle. The adjustability of the empties guiding elements (e.g. of the baffles) can be implemented very quickly, e.g. with a cycle rate <3 seconds.

It is furthermore possible, for example, for the empties guiding element to be of elongate design in a plan view of the table surface, with a front guiding-element end section (which is shaped substantially in such a way as to taper in a wedge shape/to a point), which is closer to the empties feed section, and a rear guiding-element end section, which is closer the empties discharge section.

Moreover, it is possible, for example, for the empties guiding element to be mounted so as to be pivotable about a pivot, which extends at least substantially perpendicularly to the table surface (e.g. through the empties guiding device), thus allowing the empties guiding element to be pivoted (e.g. by an electric motor mounted in the empties guiding device) into a pivoted position associated with the first guiding position and into a pivoted position associated with the second guiding position. The pivot can furthermore be movable parallel to the table surface by the empties guiding device, for example.

It is possible, for example, for the pivot of the empties guiding element to be arranged at a distance from the front guiding-element end section and between the front guiding-element end section and the rear guiding-element end section, optionally adjacent to and/or in the rear guiding-element end section.

It is possible, for example, for the empties guiding device to be designed to move the empties guiding element linearly in a direction parallel to the table surface (e.g. transversely to the transfer conveying direction, e.g. by means of an electric motor) in order to move the empties guiding element into the first and the second guiding position.

The discharge section partition wall between the empties collecting channels can be movable parallel to the table surface under the control of the control unit, for example (e.g. by means of an electric motor arranged at the downstream end of the discharge-section dividing device, or, for example, by coupling the upstream end of the discharge section partition wall to the movable pivot of the empties guiding element), thus allowing an associated empties collecting channel size to be varied (e.g. a width transverse to the transfer conveying direction, an angle with respect to the transfer conveying direction and a length in the transfer conveying direction can be variable). It is thereby possible to adapt a receiving capacity of the respective empties collecting channel to a quantity of the (expected) types (fractions) of empties to be sorted. Here, the discharge section partition wall is, for example, pivotable about an adjustment axis extending at least substantially perpendicularly to the table surface.

The empties sorting device can have a plurality of empties collecting channels, e.g. three, four, five, six or more empties collecting channels, formed adjacent to one another in the empties discharge section (e.g. formed at least substantially in the transfer conveying direction), and separated from one another by associated discharge section partition walls, of which one discharge section partition wall in each case is formed between two adjacent empties collecting channels. In this way, it is possible to sort a relatively large number of types of empties into empties fractions.

It is possible, for example, for the empties guiding device to have a plurality of empties guiding elements, e.g. two, three, four, five or more empties guiding elements.

It is possible, for example, for the discharge section partition walls to have a front partition-wall end section, which is closer to the empties feed section in the transfer conveying direction. A first number of (e.g. two) empties guiding elements is arranged upstream—in the transfer conveying direction—of and adjacent to the front partition-wall end section or sections of a number of (e.g. four) discharge section partition walls (e.g. directly in front of/adjoining or upstream at a distance from the front partition-wall end section). The first number of empties guiding elements is optionally equal to the number of discharge section partition walls.

It is possible, for example, for the empties sorting device to have a second number of empties guiding elements (e.g. one) arranged upstream of the first number of empties guiding elements (e.g. two) in respect of the transfer conveying direction. The second number of empties guiding elements is optionally arranged between laterally outermost empties guiding elements (e.g. centrally) when viewed transversely to the transfer conveying direction. In this way, empties can be sorted into a relatively large number of empties collecting channels and/or can be moved from one edge (in the transverse direction with respect to the transfer conveying direction) to the other edge of the empties conveying device.

Moreover, it is possible, for example, for a vacuum generating device to be provided for the empties sorting device in the empties feed section and/or in a region adjacent to the empties guiding element (e.g. below the empties conveying device), by which vacuum generating device it is possible to generate a vacuum, which acts through the empties conveying device (which is air-permeable, for example) on the empties conveyed thereon in order to suck the empties in the direction of the table surface. This can serve to stabilize the empties, e.g. a vertical bottle, as it is conveyed past an empties guiding element since the bottle may adhere to the empties guiding element (e.g. due to any sticky liquid residues adhering to the bottle).

It is possible, for example, for the vacuum generating device to be connected to the control unit and for the vacuum generated by the vacuum generating device to be controllable by the control unit in accordance with the conveying speed of the empties conveying device, which can be detected by a sensor of the control unit, and/or in accordance with the type of empties. This controlled suction on the bottle can serve to increase the conveying speed of the empties conveying device since the bottle is additionally stabilized by the suction in regions in which there is an excessive risk of the bottle tipping over (e.g. in the righting region in the empties feed section and in the empties/guiding element contact region).

It is possible, for example, for an empties return system according to an illustrative embodiment to have an empties sorting device of the kind described above and an automatic empties return appliance into which empties can be inserted manually (e.g. by a consumer) and from which the empties inserted can be fed automatically in the direction of the empties feed section of the empties sorting table. The automatic empties return appliance can be a conventional automatic empties return appliance of the kind that is common for the return of reusable bottles, and it is not described in detail here.

In the empties return system, it is possible, for example, for the purpose of detecting the type of empties, for the sensor of the empties sorting device to be formed by an empties detection device (e.g. a camera unit and/or a barcode scanner), which is arranged in the automatic empties return appliance.

It is furthermore possible, for example, for the empties return system to be provided with a database, which is connected or can be connected to the control unit and in which parameters (e.g. dimensions, weight, colour, distinguishing marks etc.) of the various types of empties (reusable bottles) are stored, by means of which the type of empties can be determined by the control unit (e.g. by comparing the types of empties in the database with the respective type of empties detected by the sensor).

It is possible, for example, for the empties return system to carry out the allocation of the types of empties to the individual empties collecting channels with reference to a frequency distribution of the empties fed in but also, for example, with reference to handling criteria for manual sorting, e.g. bottle size.

In addition, it is possible, for example, for the empties return system to have a plurality of automatic empties return appliances which jointly output empties to the empties sorting device.

It is furthermore possible, for example, for the empties return system to be provided with an empties conveying device, which is arranged between the automatic empties return appliance and the empties feed section of the empties sorting table and/or between the empties discharge section of the empties sorting table and an empties collecting device (e.g. an empties collecting container) in order to automatically convey the empties from the automatic empties return appliance to the empties sorting table and/or from the empties sorting table to the empties collecting device, wherein the empties conveying device has: at least one first and one second empties conveying track (e.g. a conveyor belt) for conveying the empties in a respective track conveying direction, which each have an empties conveying surface, on which the empties can be conveyed, wherein an empties transfer section is formed between the first and the second conveying track, via which empties can be transferred from the first to the second conveying track, a deflection element (e.g. a panel), which is stationary or can be moved under the control of the control unit and which is arranged in the region of the empties transfer section and is formed with a deflecting guiding surface for contacting and deflecting the empties from the first to the second conveying track (wherein, for example, the guiding surface is oriented substantially perpendicularly to one of the empties conveying surfaces and extends from the first conveying track to the second conveying track while forming an angle to the track conveying direction of the first conveying track), and a vacuum supply device, which is arranged adjacent to the deflecting element and by which it is possible to generate a vacuum (e.g. in a region in which the bottles change conveying track and/or during contact with the deflecting element) which acts (at least) through the second conveying track (which is air-permeable, for example) on the empties conveyed thereon in order to suck the empties in the direction of the empties conveying surface of the second conveying track. In this arrangement, the deflecting element and the vacuum supply device have a similar shape and function, for example, to the empties guiding element and the vacuum supply device of the empties sorting device.

FIG. 1 shows schematically an illustrative empties sorting device 1 in a plan view, wherein the empties sorting device 1 has: a rectangular empties sorting table 3 with a table surface 5, with an empties feed section 7, which is arranged at a left-hand narrow side of the empties sorting table 3 in a central region thereof and to which empties 11 of different types, in this case three different types of bottle, can be fed, starting from an automatic empties return appliance (not shown), via an empties righting device 9 (a bottle righter, which orients bottles output by the automatic empties return appliance perpendicularly to the table surface 5 and sets them down in the empties feed section 7), and with an empties discharge section 13, wherein the empties discharge section 13 has a discharge section dividing device 15 with a discharge section partition wall 17 and an adjusting device (not shown), by which discharge section partition wall 17 the empties discharge section 13 is divided into a first and a second empties collecting channel 19, 21, which are separated from one another by the discharge section partition wall 17. The discharge section partition wall 17 can be adjusted automatically along the right-hand narrow side of the empties sorting table 3 by the adjusting device.

Furthermore, the empties sorting device 1 has an empties conveying device 31, which is designed as a conveyor belt 33 between two support rollers 35, 37 mounted on the (mutually opposite) narrow sides of the empties sorting table 3. The conveyor belt 33 extends on the table surface 5 between the empties feed section 7 and the empties discharge section 13. The conveyor belt 33 transfers the empties 11, which are righted on the conveyor belt 33 within the empties feed section 7, to the empties discharge section 13 in a transfer conveying direction F (from the left-hand to the right-hand narrow side of the empties sorting table 3) and runs back again underneath the table surface 5.

Moreover, the empties sorting device 1 has an empties guiding device 41 with a movable empties guiding element 43, which is arranged upstream of the empties collecting channels 19, 21 in respect of the transfer conveying direction F in order to selectively guide the empties 11 conveyed in the transfer conveying direction F on the empties sorting table 3 by means of the conveyor belt 33 to the first and the second empties collecting channel 19, 21. The empties guiding device 41 is supported on the sorting table 3, above the latter (e.g. in the form of a bridge which spans the empties sorting table 3 transversely to the transfer conveying direction), in such a way, for example, that the empties 11 can be conveyed under the empties guiding device 41 by means of the conveyor belt 33 (the empties guiding device 41 is illustrated by dashed lines in FIG. 1 for the sake of clarity). The empties guiding element is designed as a wedge-shaped panel tapering to a point and having mutually opposite panel surfaces P1, P2, which extend perpendicularly to the table surface 5 and which are used as empties guiding surfaces for contacting and guiding the empties 11. The empties guiding element 43 is furthermore elongate (in the plan view shown) with a front guiding-element end section 45 closer to the empties feed section 7 and a rear guiding-element end section 47 closer to the empties discharge section 13. Formed in the rear guiding-element end section 47 is a pivot A, which extends perpendicularly to the table surface 5, thereby allowing the empties guiding element 43 to be pivoted by means of an electric motor (not shown) of the empties guiding device 41 into a pivoted position associated with a first guiding position L1 and into a pivoted position associated with the second guiding position L2 (the outline of the empties guiding element 43 is illustrated by dotted lines in FIG. 1 in the second guiding position L2). The first guiding position L1 is associated with the first empties collecting channel 19, and the second guiding position L2 is associated with the second empties collecting channel 21. A deflection or impact angle of the empties 11 in the first and the second guiding position L1, L2 in relation to the transfer conveying direction F is about 5° to 40° for example, e.g. optionally about 10° to 25°. For example, the pivot A can also be arranged centrally between the front and the rear guiding-element end section 45, 47, for example, with the result that, when the empties guiding element 43 is pivoted (rotated), the front and the rear guiding-element end section 45, 47 are simultaneously moved in opposite directions transversely to the transfer conveying direction F, thus making it possible, in the case of, for example, three or more empties collecting channels, for the empties 11 to be fed into each of the empties collecting channels by a single empties guiding element 43 shaped in this way since the rear guiding-element end section 47 can be positioned transversely to the transfer conveying direction F in front of all the empties collecting channels by the pivoting of the empties guiding element 43.

Moreover, the empties sorting device 1 has a control unit 51, which has a sensor 53, formed by a camera for example, by means of which the respective type of empties among the empties 11 fed to the empties feed section 7 can be automatically detected. The control unit 51 is connected to the empties guiding device 41 (represented as a double dot/dashed line in FIG. 1) and is designed to control the pivoting movement of the empties guiding element 43 into the first and second guiding positions L1, L2 thereof in accordance with the detected type of empties in order thereby to selectively guide the empties 11 to the first empties collecting channel 19 and the second empties collecting channel 21 according to the type of empties.

Moreover, the empties sorting device 1 has a vacuum generating device 61, e.g. a vacuum pump 62 and two vacuum bells (neither of which is shown) connected thereto. Here, one vacuum bell is mounted underneath the table surface 5 in the region of the empties feed section 7, and the other vacuum bell is mounted in the region of the empties guiding element 41 (referred to below for short as guiding region 63) and generates in these regions a respective vacuum, which acts through the conveyor belt 33 (which is perforated, for example) on the empties 11 conveyed thereon in order to suck the empties 11 in the direction of the table surface 5 and to stabilize them on the conveyor belt 33.

As already described above, the control unit 51 has a camera 53 as a sensor for detecting the type of empties. Furthermore, the control unit 51 can be provided with a conveyor belt speed sensor, for example, for detecting a conveyor belt speed and with a pressure sensor, for example, for detecting the vacuum generated by the vacuum generating device 61 in order to automatically control the conveyor belt 33, the empties guiding device 41 and/or the vacuum generating device 61 in accordance with the variables detected.

In FIG. 1, an illustrative motion path P of a bottle (empties 11) is furthermore illustrated by means of a dot-dashed arrow: the bottle is placed on the conveyor belt 33 in the empties feed section 7, moved towards the empties guiding element 43 in the direction of the transfer conveying direction F by the conveyor belt 33, said guiding element being in guiding position L1, contacts the panel surface P1 and, as part of the interaction between the transfer movement of the conveyor belt 33 and a sliding and/or rolling movement on the panel surface P1, is guided along the empties guiding element 43 (i.e. moved in and transversely to the transfer conveying direction F), moves out of contact with the panel surface P1 in the region of the rear guiding-element end section 47 and is moved back in the transfer conveying direction 33 by the transfer movement of the conveyor belt 33 and conveyed into the first empties collecting channel 19, in which the bottle is collected with other bottles of the same type. A motion path of another type of bottle into the second empties collecting channel 21 is analogous to this.

FIG. 2 shows schematically an illustrative empties sorting device 1 in a plan view, wherein this empties sorting device differs from that shown in FIG. 1 in that the empties guiding element 43 can be moved linearly and transversely to the transfer conveying direction F by the empties guiding device 41 (e.g. by means of an electric motor which is not shown) in order to adopt the first and the second guiding position L1, L2.

For this purpose, the empties guiding element 43 is designed as a V-shaped empties guiding element, the two panel surfaces P1, P2 of which are formed to contact and guide the empties 11 on the outsides of the two V limbs and extend perpendicularly to the table surface 5. The two panel surfaces P1, P2 are furthermore connected to one another in the front guiding-element end section 45 and form a point of the empties guiding element 43 which points upstream. An angle between the two V limbs corresponds to the deflection or impact angle(s) of the pivotable empties guiding element 43 of the embodiment in FIG. 1, for example, when it is in the first or the second guiding position L1, L2.

FIG. 3 shows schematically an illustrative empties sorting device in a plan view. A plurality of pivotable empties guiding elements, in this case three for example, and a plurality of empties collecting channels, in this case four for example, are formed. For the sake of clarity, FIG. 3 shows the arrangement of the empties guiding elements in relation to the empties collecting channels, wherein those components of the empties sorting device 1 which have been described in connection with FIG. 1 (e.g. the empties feed section, the vacuum regions etc.) are likewise provided or can likewise be provided.

The empties sorting device 1 has three discharge section partition walls (first to third) 71, 72, 23, which extend in the transfer conveying direction F and are arranged in a staggered way on the table surface 5 transversely thereto in order to form a total of four empties collecting channels (first to fourth) 75, 76, 77, 78. The central of the three discharge section partition walls 72 is arranged (at least substantially) in a central region of the conveyor belt 33, ensuring that it corresponds to the empties feed section (not shown) arranged upstream. Each of the discharge section partition walls 71, 72, 73 has a front partition-wall end section (first the third) 81, 82, 83, which is closer to the empties feed section in the transfer conveying direction F, wherein a first and a second empties guiding element 85, 86 (which have already been explained in connection with the embodiment shown in FIG. 1) are arranged adjacent to the first and the third partition-wall end section 81, 83 respectively (which are the outermost transversely to the transfer conveying direction F), upstream in the transfer conveying direction F.

A third empties guiding element 88 (e.g. of the same type) is arranged further upstream in relation to the first and the second empties guiding element 85, 86. The third empties guiding element 88 is furthermore arranged on a line between the second partition-wall end section 82 and the empties feed section 7, i.e. the empties 11 are conveyed to the third empties guiding element 88 by the conveyor belt 33 and guided selectively to the second or third empties collecting channel 76, 77 by the third empties guiding element 88. The second empties guiding element 85, which is arranged downstream of the third empties guiding element 88, can either allow the empties 11 guided to the second empties collecting passage 76 by the third empties guiding element 88 to pass (i.e. to enter the second empties collecting channel 76) or can guide the empties 11 into the first empties collecting channel 75. Similarly, the second empties guiding element 86, which is arranged downstream of the third empties guiding element 88, can either allow the empties 11 guided to the third empties collecting passage 77 by the third empties guiding element 88 to pass (i.e. to enter the third empties collecting channel 77) or can guide the empties 11 into the fourth empties collecting channel 78.

Figure 4:
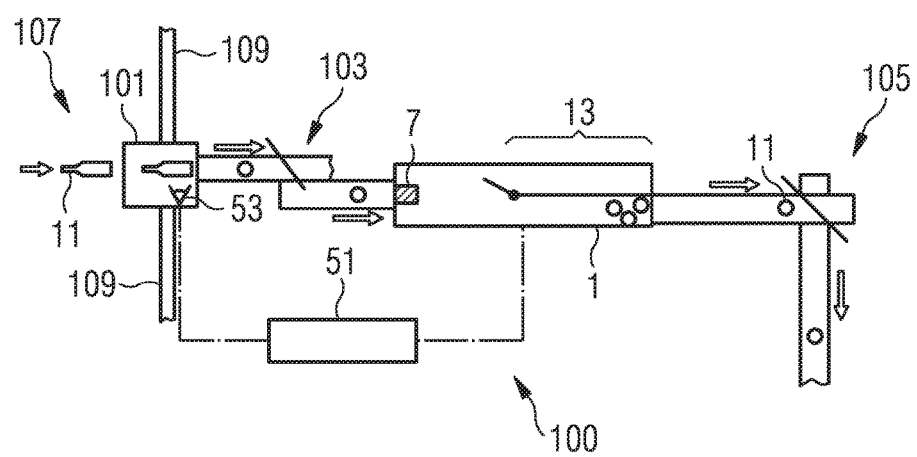
FIG. 4 shows a schematic plan view of an empties return device according to an illustrative embodiment.

FIG. 4 shows schematically, in a plan view, an empties return system 100 according to an illustrative embodiment which has the above-described empties sorting device 1, an automatic empties return appliance 101 and a first and a second empties conveying device 103, 105 (further details of the automatic empties return appliance follow below, as do details of the first and second empties conveying device 103, 105, which are explained in connection with FIG. 5A and FIG. 5B). The automatic empties return appliance 101 is connected to the first empties conveying device 103 and outputs empties 11 inserted into it to the first empties conveying device 103. The first empties conveying device 103 is connected to the empties sorting device 1 and conveys the empties 11 to the empties feed section 7 of the empties sorting device 1. The empties sorting device 1 is connected by means of its empties discharge section 13 to the second empties conveying device 105, which in this case receives one type of empties from the empties sorting device 1 and carries it away, e.g. to an empties collecting container (not shown). The arrangement of the first and the second empties conveying device 103, 105 can also be interchanged. It is likewise possible for a plurality of automatic empties return appliances to be connected to the empties sorting device 1 by means of the first empties conveying device or further first empties conveying devices and for further second empties conveying devices to be linked to the empties sorting device 1. Moreover, it is also possible, for example, for just one of the first and second empties conveying devices 103, 105 to be used or, for example, for the automatic empties return appliance 101 to be connected directly to the empties sorting device 1.

The automatic empties return appliance 101 is set up in an appliance zone 107 of an empties return point (e.g. a supermarket or cash-and-carry outlet for drinks), thus allowing consumers to insert empties 11 on a front side of the automatic empties return appliance 101 and thus return them. Usually, the automatic empties return appliance 101 is set up in such a way that at least the rear side thereof is separated spatially from the appliance zone 107, e.g. by a wall 109. The handling of the empties 11 is carried out on the rear side of the automatic return appliance 101 (i.e. behind the wall 109), keeping noise and smells due to the handling of the empties away from the appliance zone 107. The sensor 53 of the control unit 51 for detecting the type of empties is formed by an empties detection device (e.g. a camera and/or a barcode scanner), which is arranged in the automatic empties return appliance 101. The control unit 51 furthermore has a database, which is connected to the control unit 51 and in which parameters of the various types of empties are stored, by means of which it is possible for the control unit 51 to determine the type of empties (e.g. by comparing the type of empties detected by the empties detection device with types of empties stored in the database). The database can also be designed as part of the empties detection device, for example, or can be provided in a decentralized location and connected to the control unit 51 by means of a network, for example (e.g. the database can be provided on a server and can be connected to the control unit 51 via the Internet, for example, or via a communications network, for example (e.g. LAN, WLAN etc.)).

An operation for handling empties 11 (e.g. a bottle) after return, said operation being typical of the empties return system 100 shown in FIG. 4, proceeds as follows: the bottle inserted into the automatic empties return appliance 101 by the consumer is detected by the empties detection device 53 (e.g. a bottle size, a bottle weight, a bottle geometry, an identification mark of the bottle, e.g. a barcode) and information relating thereto is transmitted to the control unit 51, allowing the control unit to determine the type of bottle from the database with the aid of the parameters. The bottle is then output by the automatic empties return appliance 101 and conveyed by means of the first empties conveying device 103 to the empties sorting device 1 and transferred to the latter. In the empties sorting device 1, the bottle is sorted into an associated empties collecting channel under the control of the control unit 51, e.g. with reference to a frequency distribution of the empties to be sorted. The bottles collected in said empties collecting channel (e.g. the most frequently occurring bottles among the empties) are then transferred to the second empties conveying device 105 and conveyed by the latter to the empties collecting container (not shown), whereas the types of bottles collected in other empties collecting channels are sorted into empties crates by workers at the empties return point.

Figure 5A:
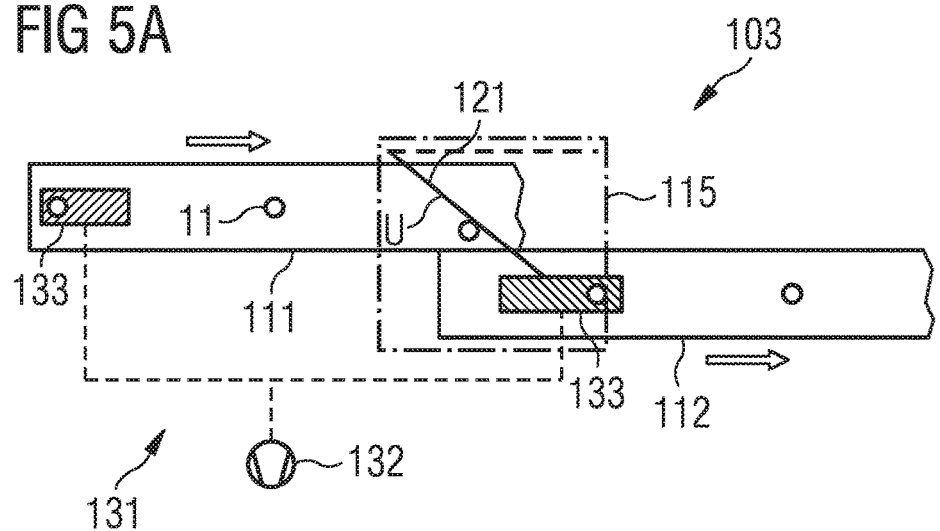
FIG. 5 shows two schematic detail plan views (FIG. 5A and FIG. 5B) of two empties conveying devices, which are used with the empties return device in FIG. 4.
Figure 5B:
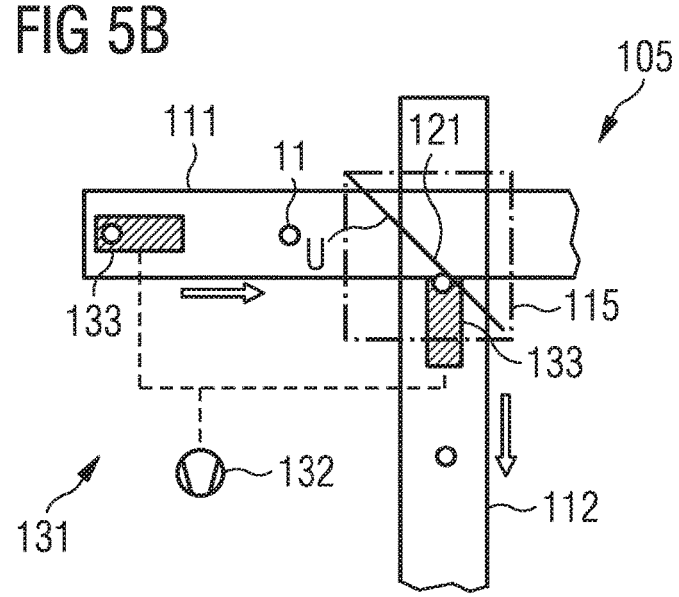

FIG. 5A and FIG. 5B show the first and the second empties conveying device 103, 105, respectively, from FIG. 4 in detail.

The first empties conveying device 103, which is shown in FIG. 5A, has a first and a second empties conveying track, which are designed as conveyor belts 111, 112, run parallel to one another and run adjacent to one another in an empties transfer section 115 and convey the empties 11 in the same track conveying direction within the empties transfer section 115 (downstream of the transfer section 115, the conveyor belts can run in different track conveying directions, for example). At one end, the empties 11 can be placed on an empties conveying surface of the first conveyor belt 111 by the automatic empties return appliance 101, with the result that the empties 11 are conveyed on the first conveyor belt 111 to the empties transfer section 115, in which the empties 11 can be transferred under selective control (e.g. by the control unit 51) to the second conveyor belt 112, which conveys the empties 11 to the empties sorting device 1 (the first conveyor belt 111 can be connected further on to a further empties sorting device (not shown), for example).

The first empties conveying device 103 furthermore has a pivotable deflection element 121, which is arranged in the region of the empties transfer section 115 (illustrated in dot-dashed lines in FIG. 5A) and which is designed with a deflecting guiding surface U for contacting and deflecting the empties 11 from the first of the second conveyor belt 111, 112. The deflection element 121 can be pivoted selectively (e.g. by the control unit 51) into the region of the empties transfer section 115 (an unpivoted position is illustrated in dashed lines in FIG. 5A). The deflecting guiding surface U is oriented substantially perpendicularly to the conveying surface of the first and of the second conveyor belt 111, 112 and extends from the first conveyor belt 111 to the second conveyor belt 112 at an angle to the track conveying direction of the first conveyor belt 111. In general, the operation of the deflection element 121 is similar to that of the empties guiding element 43 of the empties sorting device 1.

Moreover, the first empties conveying device 103 has a vacuum supply device 131 in the form of a vacuum pump 132, which generates a vacuum. The vacuum acts via a vacuum bell (not shown; the region in which the vacuum can be provided is denoted by reference sign 133), which is provided adjacent to the deflection element 121, through the second conveyor belt 112 (which is perforated, for example) on the empties 11 conveyed on said belt in order to suck the empties 11 in the direction of the empties conveying surface of the second conveyor belt 112. Moreover, the vacuum supply device 131 can also supply a vacuum in the region of the first conveyor belt 111 (see reference sign 133), in which region the empties 11 are placed on the first conveyor belt 111. The vacuum supply device used here is designed to be similar in form and function to the vacuum generating device 61 of the empties sorting device 1, for example.

The second empties conveying device 105, which is shown in FIG. 5B, has a similar structure to the first empties conveying device 103 described in FIG. 5A, but with the difference that the first and the second conveyor belt 111, 112 cross over (in this case, the second conveyor belt 112 crosses below the first conveyor belt 111 at a right angle to the track conveying direction thereof, wherein the associated empties conveying surfaces are at a minimum distance from one another, i.e. the empties conveying surfaces are separated from one another only by the thickness of the conveyor belts; e.g. intersection angles other than a right angle are also possible). Furthermore, the deflection element 121 in the second empties conveying device 105 is designed to be stationary in the region of the empties transfer section 115 (however, a pivotable deflection element like that used in the first empties conveying device is also possible and vice versa).

While the invention has been particularly shown and described with reference to specific embodiments, it should be understood by those skilled in the art that various changes in form and detail may be made therein without departing from the spirit and scope of the invention as defined by the appended claims. The scope of the invention is thus indi-

What is claimed is:

1. An empties sorting device for automatic sorting of empties, the empties sorting device comprising:
    an empties sorting table with a table surface, an empties feed section, to which empties of different types can be fed, and with an empties discharge section, wherein the empties discharge section has a discharge section dividing device with at least one discharge section partition wall, by which the empties discharge section is divided into at least one first and one second empties collecting channel, which are separated from one another by the at least one discharge section partition wall;
    an empties conveying device, which is installed on the empties sorting table and which extends between the empties feed section and the empties discharge section and which is designed in such a way that the empties fed to the empties feed section can be transferred by the empties conveying device from the empties feed section to the empties discharge section in a transfer conveying direction;
    an empties guiding device with a movable empties guiding element, which is arranged on the empties sorting table upstream of the empties collecting channels in respect of the transfer conveying direction and which is designed to be movable at least into a first guiding position, which is associated with the first empties collecting channel, and a second guiding position, which is associated with the second empties collecting channel, in order to guide the empties conveyed in the transfer conveying direction on the empties sorting table by the empties conveying device selectively to the first and the second empties collecting channel, wherein the movable empties guiding element moves linearly in a direction generally parallel to the table surface and in a direction generally transverse to the transfer conveying direction in order to move the empties guiding element into the first and the second collecting channels; and
    a controller, which has a sensor, by which the respective type of empties among the empties fed to the empties feed section can be automatically detected, and which is connected to the empties guiding device and which is designed to control the movement of the empties guiding element into the first and second guiding positions in accordance with the type of empties detected in order thereby to guide the empties selectively to the first empties collecting channel and the second empties collecting channel according to the type of empties;
    wherein the discharge section partition wall between the empties collecting channels can be moved parallel to the table surface under the control of the controller, thus allowing an associated empty collecting channel size to be varied.

2. The empties sorting device of claim 1,
    wherein the element of elongate design in a plan view of the table surface, with a front guiding-element end section, which is closer to the empties feed section, and a rear guiding-element end section, which is closer to the empties discharge section.

3. The empties sorting device of claim 1,
    wherein a plurality of empties collecting channels is formed adjacent to one another in the empties discharge section, and said empties collecting channels are separated from one another by associated discharge section partition walls, of which one discharge section partition wall in each case is formed between two adjacent empties collecting channels.

4. The empties sorting device of claim 1,
    wherein the empties guiding device has a plurality of empties guiding elements.

5. The empties sorting device of claim 3,
    wherein each of the discharge section partition walls has a front partition-wall end section, which is closer to the empties feed section in the transfer conveying direction, wherein a first number of empties guiding elements is arranged upstream—in the transfer conveying direction—of and adjacent to the front partition-wall end section or sections of a number of discharge section partition walls.

6. The empties sorting device of claim 5,
    wherein the first number of empties guiding elements is equal to or less than the number of discharge section partition walls.

7. The empties sorting device of claim 5
    wherein a second number of empties guiding elements is arranged upstream of the first number of empties guiding elements in respect of the transfer conveying direction.

8. The empties sorting device of claim 7
    wherein the second number of empties guiding elements is arranged between laterally outermost empties guiding elements when viewed transversely to the transfer conveying direction.

9. The empties sorting device of claim 1,
    wherein a vacuum generating device is provided at least one of in the empties feed section or in a region adjacent to the empties guiding element, by which vacuum generating device it is possible to generate a vacuum, which acts through the empties conveying device on the empties conveyed thereon in order to suck the empties in the direction of the table surface.

10. An empties return system, comprising:
    an empties sorting device, comprising:
    an empties sorting table with a table surface, an empties feed section, to which empties of different types can be fed, and with an empties discharge section, wherein the empties discharge section has a discharge section dividing device with at least one discharge section partition wall, by which the empties discharge section is divided into at least one first and one second empties collecting channel, which are separated from one another by the at least one discharge section partition wall;
    an empties conveying device, which is installed on the empties sorting table and which extends between the empties feed section and the empties discharge section and which is designed in such a way that the empties fed to the empties feed section can be transferred by the empties conveying device from the empties feed section to the empties discharge section in a transfer conveying direction;
    an empties guiding device with a movable empties guiding element, which is arranged on the empties sorting table upstream of the empties collecting channels in respect of the transfer conveying direction and which is designed to be movable at least into a first guiding position, which is associated with the first empties collecting channel, and a second guiding position, which is associated with the second empties collecting channel, in order to guide the empties conveyed in the transfer conveying direction on the empties sorting table by the empties conveying device selectively to the first and the second empties collecting channel, wherein the movable empties guiding element moves linearly in a direction generally parallel to the table surface and in a direction generally transverse to the transfer conveying direction in order to move the empties guiding element into the first and the second collecting channels; and a controller, which has a sensor, by which the respective type of empties among the empties fed to the empties feed section can be automatically detected, and which is connected to the empties guiding device and which is designed to control the movement of the empties guiding element into the first and second guiding positions in accordance with the type of empties detected in order thereby to guide the empties selectively to the first empties collecting channel and the second empties collecting channel according to the type of empties;

wherein the discharge section partition wall between the empties collecting channels can be moved parallel to the table surface under the control of the controller, thus allowing an associated empties collecting channel size to be varied; and an automatic empties return appliance, into which empties can be inserted manually and from which the empties inserted can be fed automatically towards the empties feed section of the empties sorting table.

11. The empties return system of claim 10, wherein, for the purpose of detecting the type of empties, the sensor of the empties sorting device is formed by an empties detection device, which is arranged in the automatic empties return appliance.

12. The empties return system of claim 10, further comprising:

a database, which is connected or can be connected to the controller and in which parameters of the various types of empties are stored, by which the type of empties can be determined by the controller.

13. The empties return system of claim 10, further comprising:

an empties conveying device, which is arranged at least one of between the automatic empties return appliance and the empties feed section of the empties sorting table or between the empties discharge section of the empties sorting table and an empties collecting device in order to automatically convey the empties at least one of from the automatic empties return appliance to the empties sorting table or from the empties sorting table to the empties collecting device, wherein the empties conveying device comprises:

at least one first and one second empties conveying track for conveying the empties in a respective track conveying direction, which each have an empties conveying surface, on which the empties can be conveyed, wherein an empties transfer section is formed between the first and the second conveying track, via which empties can be transferred from the first to the second conveying track;

a deflection element, which is stationary or can be moved under the control of the controller and which is arranged in the region of the empties transfer section and is formed with a deflecting guiding surface for contacting and deflecting the empties from the first to the second conveying track; and a vacuum supply device, which is arranged adjacent to the deflecting element and by which it is possible to generate a vacuum which acts through the second conveying track on the empties conveyed thereon in order to suck the empties in the direction of the empties conveying surface of the second conveying track.

14. The empties sorting device of claim 1, wherein the movable empties guiding element is designed as a V-shape consisting of two panels attached at one end to form the V-shape, the movable empties guiding element having a point-end and an open-end, and having two outer surfaces extending from the point-end to each side of the open-end, the point-end facing in a direction opposite to the transfer conveying direction, the open-end facing in a direction of the transfer conveying direction; and wherein the outer surfaces of the movable empties guiding element contact and guide the empties into an empties collecting channel.

15. The empties return system of claim 10, wherein the movable empties guiding element is designed as a V-shape consisting of two panels attached at one end to form the V-shape, the movable empties guiding element having a point-end and an open-end, and having two outer surfaces extending from the point-end to each side of the open-end, the point-end facing in a direction opposite to the transfer conveying direction, the open-end facing in a direction of the transfer conveying direction; and wherein the outer surfaces of the movable empties guiding element contact and guide the empties into an empties collecting channel.

* * * * *